(12) United States Patent
Ota

(10) Patent No.: US 8,092,014 B2
(45) Date of Patent: Jan. 10, 2012

(54) PLASTIC LENS AND MANUFACTURING METHOD THEREOF

(75) Inventor: Hiroshi Ota, Tokyo (JP)

(73) Assignee: Hoya Corporation, Tokyo (JP)

( * ) Notice: Subject to any disclaimer, the term of this patent is extended or adjusted under 35 U.S.C. 154(b) by 118 days.

(21) Appl. No.: 12/503,400

(22) Filed: Jul. 15, 2009

(65) Prior Publication Data

US 2010/0014144 A1    Jan. 21, 2010

(30) Foreign Application Priority Data

Jul. 17, 2008   (JP) ................................ 2008-186468

(51) Int. Cl.
*G02C 7/10*    (2006.01)
*G02C 7/02*    (2006.01)
*B32B 27/36*    (2006.01)

(52) U.S. Cl. .......... 351/163; 351/44; 351/165; 351/166; 428/412

(58) Field of Classification Search .................. 351/163, 351/165, 166, 177
See application file for complete search history.

(56) References Cited

U.S. PATENT DOCUMENTS

| 7,144,598 | B2* | 12/2006 | Moravec et al. | 427/164 |
| 2004/0220292 | A1 | 11/2004 | Momoda et al. | |
| 2005/0168690 | A1* | 8/2005 | Kawai et al. | 351/163 |
| 2006/0023160 | A1* | 2/2006 | Cartier et al. | 351/159 |
| 2008/0074613 | A1* | 3/2008 | Phillips | 351/177 |
| 2008/0231795 | A1* | 9/2008 | Cartier | 351/49 |
| 2009/0027782 | A1* | 1/2009 | Takahashi et al. | 359/819 |
| 2009/0202706 | A1* | 8/2009 | Kousaka et al. | 427/8 |
| 2010/0012262 | A1* | 1/2010 | Hsu | 156/245 |
| 2011/0129599 | A1* | 6/2011 | Begon et al. | 427/164 |

FOREIGN PATENT DOCUMENTS

| WO | WO 03/011967 A1 | 2/2003 |
| WO | WO 2006/132200 | * 12/2006 |
| WO | WO-2007/142136 | * 12/2007 |

* cited by examiner

*Primary Examiner* — Jordan Schwartz
(74) *Attorney, Agent, or Firm* — Oblon, Spivak, McClelland, Maier & Neustadt, L.L.P.

(57) ABSTRACT

A plastic lens plastic includes a plastic substrate (1) having a first main surface that is a convex surface (1A) and a second main surface that is a concave surface (1B), a photochromic compound-containing photochromic layer formed on the convex surface side of the substrate, and an impact-absorbing primer layer formed on the concave surface side of the substrate.

6 Claims, 2 Drawing Sheets

PLASTIC LENS AND MANUFACTURING METHOD THEREOF

CROSS REFERENCES TO RELATED APPLICATIONS

The present invention contains subject matter related to Japanese Patent Application JP 2008-186468 filed in the Japanese Patent Office on Jul. 17, 2008, the entire contents of which being incorporated herein by reference.

BACKGROUND OF THE INVENTION

1. Field of the Invention

The present invention relates to a plastic lens having a photochromic layer and a manufacturing method thereof. Particularly, the present invention relates to a plastic lens having a photochromic layer which exhibits excellent photochromic properties.

2. Description of the Related Art

Photochromism is a phenomenon exhibited by a compound which reversibly changes color when exposed to light containing ultraviolet rays such as sunlight, and returns to its original color (colorless state) when the ultraviolet radiation is discontinued.

Photochromic properties are beneficial in manufacturing plastic spectacle lenses.

The following three methods, for example, are proposed to be used to manufacture a plastic spectacle lens having photochromic properties.

The first method is to impregnate a photochromic compound into surface of a lens having no photochromic properties.

The second method is to form a primer layer having photochromic properties and a hard coat layer on the surface of a lens by coating.

The third method is to dissolve a photochromic compound into a monomer, and then polymerize the monomer to directly obtain a photochromic lens.

Particularly, since the second method (i.e., the coating method) can be applied to various existing plastic lenses, it has been receiving wide attention recently (see, for example, International Publication No. WO03/011967).

International Publication No. WO03/011967 discloses a method in which a material obtained by dissolving a photochromic compound into a radical polymerizable monomer is coated on the surface of a lens, and then the coated material is cured by ultraviolet radiation.

This method is effective because it can also be applied to recently-developed high refractive index materials.

SUMMARY OF THE INVENTION

Thickness of the lens can be reduced by using material having high refractive index. However, in that case it will be difficult to maintain the strength of the lens when thickness of the lens is reduced.

In order to maintain the strength of the lens, a primer layer is formed between the lens material and the hard coat layer, so that impact resistance can be improved.

In the case where a hard coat layer and a primer layer for absorbing impact applied to the hard coat layer are also formed on the side of the photochromic layer, the primer layer should be formed between the photochromic layer and the hard coat layer.

However, if the primer layer for improving impact resistance is arranged adjacent to the photochromic layer, there is possibility that change may be caused to the photochromic layer and therefore desired light modulating performance may not be obtained.

To solve the above problems, it is an object of the present invention to provide a plastic lens having impact resistance and good light modulating performance attributed to photochromic properties, and a manufacturing method thereof.

A plastic lens plastic according to an aspect of the present invention includes: a plastic substrate having a first main surface that is a convex surface and a second main surface that is a concave surface; a photochromic compound-containing photochromic layer formed on the convex surface side of the substrate; and an impact-absorbing primer layer formed on the concave surface side of the substrate.

With such a configuration of the plastic lens according to this aspect of the present invention, light modulating performance attributed to photochromic properties can be obtained owing to the provision of the photochromic layer containing the photochromic compound.

Further, since impact is absorbed by the impact-absorbing primer layer, sufficient impact resistance can be obtained.

Further, the impact-absorbing primer layer is formed on the concave surface side of the substrate and the photochromic layer is formed on the convex surface side of the substrate. In other words, the impact-absorbing primer layer is not formed on the convex surface side of the substrate where the photochromic layer is formed. With such a configuration, effect caused due to the contact of the impact-absorbing primer layer to the photochromic layer can be avoided, and therefore better light modulating performance attributed to the photochromic layer can be obtained.

A manufacturing method of a plastic lens according to another aspect of the present invention includes the steps of: forming, with respect to a plastic substrate having a first main surface that is a convex surface and a second main surface that is a concave surface, a photochromic compound-containing photochromic layer on the convex surface side of the substrate; and forming an impact-absorbing primer layer on the concave surface side of the substrate.

With the manufacturing method of a plastic lens according to this aspect of the present invention, the plastic lens of the present invention in which the photochromic layer is formed on the convex surface side of the substrate and the impact-absorbing primer layer is formed on the concave surface side of the substrate can be easily manufactured.

With the configuration of the plastic lens and the manufacturing method of the plastic lens according to the present invention, it is possible to provide a plastic lens having good impact resistance and good light modulating performance attributed to photochromic properties.

DETAILED DESCRIPTION OF THE PREFERRED EMBODIMENT(S)

Figure 1:
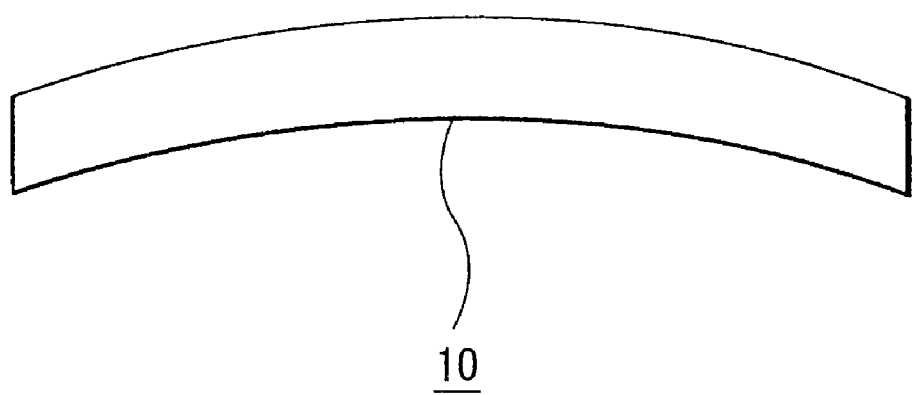
FIG. 1 is a cross section showing a schematic configuration of a plastic lens according to an embodiment of the present invention.

A plastic lens according to an embodiment of the present invention includes a plastic substrate having a first main surface (which is a convex surface) and a second main surface (which is a concave surface), a photochromic compound-containing photochromic layer formed on the convex surface side of the substrate, and an impact-absorbing primer layer formed on the concave surface side of the substrate.

Examples of the material of the plastic substrate include copolymer of methyl methacrylate and at least one other monomer, copolymer of diethylene glycol bisallyl carbonate and at least one other monomer, copolymer of polyurethane and polyurea, polycarbonate, polystyrene, polyvinyl chloride, unsaturated polyester, polyethylene terephthalate, polyurethane, polythiourethane, sulfide resin obtained by utilizing an enethiol reaction, sulfur-containing vinyl polymer and the like.

The photochromic layer may have a structure obtained by dispersing a photochromic compound (such as a dye) into a resin layer.

In order to form the photochromic layer, a photochromic coating liquid is prepared by containing a curable component (such as a monomer and the like), a polymerization initiator, a photochromic compound and other additives, and then the prepared photochromic coating liquid is coated, polymerized and cured.

Incidentally, the order of adding the respective components of the photochromic coating liquid is not particularly limited. For example, all the components may be added at the same time, or the curable component (such as a monomer or the like) may be previously mixed and then the photochromic compound and other additives are added and mixed immediately before polymerization.

The material of the curable components contained in the photochromic coating liquid is not particularly limited. Examples of the material of the curable component include known photopolymerizable monomers and oligomers having radical polymerizable group such as (meth)acryloyl group, (meth)acryloyloxy group, vinyl group, allyl group, styryl group, and prepolymers of the photopolymerizable monomers and oligomers. Among these compounds, the compound having acryloyl group or (meth)acryloyloxy group (as the radical polymerizable group) is preferably used due to their availability and good curability. Incidentally, "(meth)acryloyl group" represents both acryloyl group and methacryloyl group.

The polymerization initiator to be added into the photochromic coating liquid can be selected from known thermal polymerization initiators and photopolymerization initiators according to polymerization procedure.

The photopolymerization initiators are not particularly limited. Examples of the photopolymerization initiators include benzoin, benzoin methyl ether, benzoin butyl ether, benzophenol, acetophenone and the like.

Content of the photopolymerization initiator based on the total amount of the photochromic coating liquid is usually in a range of 0.001-5 parts by mass, preferably in a range of 0.1-1 parts by mass based on 100 parts by mass of the curable component (i.e., a radical polymerizable monomer or the like).

The photopolymerization initiator may be used by one kind alone, or two or more kinds of photopolymerization initiators may be used in suitable combination.

Examples of the thermal polymerization initiator include peroxides, peroxy ester, percarbonates, azo compound and the like.

Content of the thermal polymerization initiator based on the total amount of the photochromic coating liquid is usually in a range of 0.01-10 parts by mass based on 100 parts by mass of the curable component (i.e., a radical polymerizable monomer or the like), although it changes according to polymerization condition, type of the thermal polymerization initiator, type and composition of the polymerizable monomer and the like.

The thermal polymerization initiator may be used by one kind alone, or two or more kinds of thermal polymerization initiators may be used in suitable combination.

The photochromic compound can be a known photochromic compound. Examples of the photochromic compound include fulgimide compound, spirooxazine compound, chromene compound and the like.

Among the examples of the photochromic compound described above, the chromene compound is preferably used due to its better photochromic durability, higher color density and higher fading rate, compared with other photochromic compounds.

Incidentally, a plurality of photochromic compounds may be used in suitable combination in order to find suitable color tone.

Content of the photochromic compound in the photochromic coating liquid is preferably in a range of 0.01-20 parts by mass, more preferably in a range of 0.1-10 parts by mass based on 100 parts by mass of the curable component (i.e., the radical polymerizable monomers or the like).

The photochromic coating liquid may further contain additives such as surfactant, leveling agent, antioxidant, radical-capturing agent, ultraviolet stabilizer, ultraviolet absorber, mold release agent, color protection agent, antistat, fluorescent dye, dye, pigment, fragrance, plasticizer and the like in order to improve photochromic durability, coloring rate, fading rate and moldability.

Known compounds may be used as these additives without any limitation.

The thickness of the photochromic layer is preferably 10 µm or more, preferably in a range of 20-60 µm.

Polyurethane resin is preferably used as the material of the impact-absorbing primer layer.

The impact-absorbing primer layer may also be formed by a polyurethane resin containing silane compound and fillers such as $SiO_2$ and the like.

Polyurethane resin has modest flexibility and therefore can absorb impact.

The impact-absorbing primer layer can be formed by mixing the raw material and additives to prepare a coating liquid, and then coating the coating liquid and curing the coated liquid.

The coating liquid may be prepared either by mixing an isocyanate compound and copolyol, or by dispersing polyurethane into a solvent. The former method is used to prepare a type of the coating liquid by mixing an isocyanate compound and copolyol; and the latter method is used to prepare another type of the coating liquid by using reacted polyurethane.

In the plastic lens according to the present invention, since no impact-absorbing primer layer is formed on the photochromic layer side (the convex surface side of the substrate) of the lens, no influence will be exerted on the photochromic layer no matter what type of the coating liquid of the primer layer is used.

In the plastic lens according to the present invention, since the impact-absorbing primer layer is only formed on the concave surface side of the substrate, a coating method allowing only one surface of the substrate to be coated is used to coat the coating liquid. Particularly, spin coating method is preferably used as the coating method.

The thickness of the impact-absorbing primer layer is preferably in a range of 0.1-3.0 µm.

In the plastic lens according to the present invention, a hard coat layer may be formed on both the side of the impact-absorbing primer layer opposite to the side facing the substrate, and the side of the photochromic layer opposite to the side facing the substrate.

Further, an antireflection film may be formed on each hard coat layer.

Further, a water repellent layer, a protective layer and/or the like may be further formed on the surface.

The material of the hard coat layer is not particularly limited. The material of the hard coat layer may be a coating composition containing a known organosilicon compound and colloidal particles of a metal oxide.

The material of the antireflection film is not particularly limited. The antireflection film may have a single or multi-layered construction formed by known inorganic oxide, organic substance and/or the like.

Figure 2:
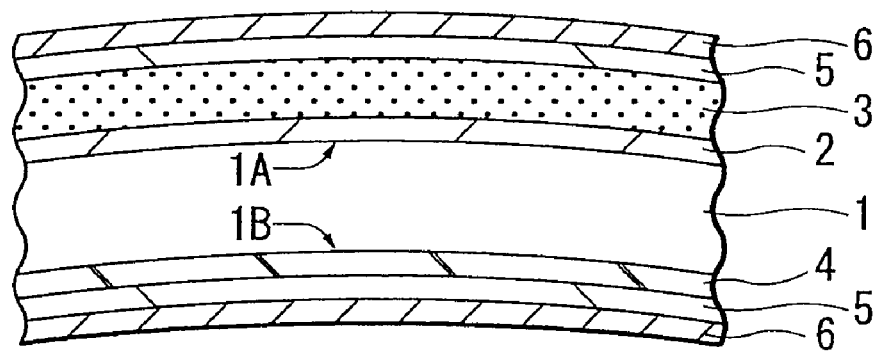
FIG. 2 is an enlarged cross section showing a primary portion of the plastic lens shown in FIG. 1.

FIG. 1 shows a schematic configuration of a plastic lens 10 according to an embodiment of the present invention, and FIG. 2 shows a cross section of a primary portion of FIG. 1.

As shown in FIG. 2, the plastic lens 10 includes a plastic substrate 1 having a first main surface 1A (an upper surface in FIG. 2) which is a convex surface, and a second main surface 1B (a lower surface in FIG. 2) which is a concave surface.

Various layers 2, 3, 4, 5, 6 (which are to be described later) are formed on the both main surface 1A, 1B.

A first primer layer 2 is formed on the convex surface 1A of the substrate 1.

Further, a photochromic layer 3, a hard coat layer 5 and an antireflection film 6 are laminated on the first primer layer 2 in this order.

The first primer layer 2 is provided for improving adhesion between the photochromic layer 3 and the substrate 1.

The first primer layer 2 is formed by a material for forming a general primer layer. Examples of such a material include polyester resin, epoxy resin, melamine resin, polyurethane acrylate resin.

A second primer layer 4 is formed on the concave surface 1B of the substrate 1.

Further, a hard coat layer 5 and an antireflection film 6 are laminated on the second primer layer 4 in this order.

The plastic materials described above can be used to form the substrate 1.

The material of the substrate 1 is selected according to the specification of the plastic lens 10, taking into consideration the refractive index and the like.

As described above, the photochromic layer 3 may have a structure obtained by dispersing a photochromic compound (such as a dye) into a resin layer.

Various photochromic compounds such as the aforesaid chromene compound and the like can be used as the photochromic compound of the photochromic layer 3.

Impact resistance of the plastic lens 10 can be improved owing to the provision of the second primer layer 4 having impact absorbing properties formed on the concave surface 1B of the substrate 1.

Polyurethane resin, for example, can be used as the material of the primer layer 4. The primer layer 4 may also be formed by a polyurethane resin containing silane compound and fillers such as $SiO_2$ and the like.

The material of the hard coat layer 5 may be a coating composition containing a known organosilicon compound and colloidal particles of a metal oxide.

The material of the antireflection film 6 may have a single or multi-layered construction formed by known inorganic oxide, organic substance and/or the like.

The plastic lens 10 according to the present invention may be manufactured by the following steps.

First, plastic for manufacturing the substrate 1 is molded into the substrate 1 having a predetermined shape including a convex surface 1A and a concave surface 1B.

Next, a coating liquid for forming the first primer layer 2 is prepared. Further, the coating liquid is coated on the convex surface 1A of the substrate 1 by, for example, spin coating method, and then the coated material is cured to form the first primer layer 2.

Next, a coating liquid for forming the photochromic layer 3 is prepared. Further, the coating liquid is coated on the first primer layer 2 by, for example, spin coating method, and then the coated material is cured to form the photochromic layer 3.

Next, a coating liquid for forming the second primer layer 4 having impact absorbing properties is prepared. Further, the coating liquid is coated on the concave surface 1B of the substrate 1 by, for example, spin coating method, and then the coated material is cured to form the second primer layer 4.

Next, a coating liquid for forming the hard coat layers 5 is prepared. Further, the coating liquid is coated both on the convex surface side and on the concave surface side, and then the coated material is cured to form the hard coat layers 5. Since the hard coat layers 5 are formed on both surfaces, the coating liquid is preferably coated by dipping method.

Next, the antireflection films 6 are formed on the hard coat layers 5. The antireflection films 6 are formed by vapor-deposition method if inorganic material is used. However, if organic material is used, the coating liquid should be coated and cured to form the antireflection films 6.

In such a manner, the plastic lens 10 shown in FIGS. 1 and 2 can be manufactured.

With the configuration of the plastic lens 10 according to the present embodiment, light modulating performance attributed to photochromic properties can be obtained by forming the photochromic layer 3 on the convex surface 1A side of the substrate 1.

Further, since the second primer layer 4 having impact absorbing properties is formed on the concave surface 1B side of the substrate 1, impact can be absorbed, and therefore sufficient impact resistance can be obtained.

Further, as shown in FIG. 2, on the convex surface 1A side of the substrate 1, the hard coat layer 5 is directly formed on the photochromic layer 3, and the second primer layer 4 having impact absorbing properties is not formed on the photochromic layer 3.

With such a configuration, there is no concern that desired light modulating performance may not be obtained due to the change caused to the photochromic layer.

Thus, with the plastic lens 10 according to the present embodiment, it is possible to provide a plastic lens having good impact resistance and good photochromic properties.

Although the present embodiment has a configuration in which the hard coat layers 5 and the antireflection films 6 are formed, the present invention may also include other possible configurations.

For example, a water repellent layer and/or a protective layer for protecting surface may be further formed on each of the antireflection films of the both surfaces.

Further, the photochromic layer may also be directly formed on the substrate if good adhesion between the substrate and the photochromic layer can be obtained. And in such a case, the first primer layer 2 shown in FIG. 2 is eliminated.

EXAMPLES

The present invention will be concretely described using below examples, and it should be understand that the present invention is not limited to these examples.

Example 1

The plastic lens 10 shown in FIGS. 1 and 2 was manufactured by the following steps.
(1) Primer Coating
In Example 1, polythiourethane (trade name: EYAS; manufactured by HOYA Corporation; center thickness: 1.0 mm; radius: 75 mm; S-4.00) was used as the substrate 1 of the plastic lens 10, and aqueous polyurethane resin liquid (polycarbonate polyol-based polyurethane emulsion; viscosity: 100 CPS; solid content: 38%) was used as the primer coating liquid.

Further, the primer coating liquid was coated on the convex surface 1A of the substrate 1 by spin coating method. Thereafter, the coated film was naturally dried for 15 minutes under an atmosphere of 25° C. and 50% RH to form the first primer layer 2. The thickness of the first primer layer 2 was 7 μm.

(2) Photochromic Coating (i) Prepare Photochromic Coating Liquid 100 parts by mass of a radical polymerizable monomer was added into a plastic container, the radical polymerizable monomer containing 20 parts by mass of trimethylolpropane trimethacrylate, 35 parts by mass of BPE oligomer (2,2-bis (4-methacryloyloxypolyethoxyphenyl) propane), 10 parts by mass of EB6A (polyester oligomer hexaacrylate), 10 parts by mass of polyethylene glycol diacrylate having an average molecular weight of 532, and 10 parts by mass of glycidyl methacrylate. 3 parts by mass of a chromene compound having a chemical structure indicated below (as photochromic dye), 5 parts by mass of a light stabilizer LS765 (bis(1,2,2,6, 6-pentamethyl-4-pyperidyl) sebacate, methyl(1,2,2,6,6-pentamethyl-4-pyperidyl) sebacate), 5 parts by mass of a hindered phenol antioxidant Irganox 245 (manufactured by Ciba Specialty Chemicals), and 0.8 parts by mass of an ultraviolet polymerization initiator CGI-1870 (manufactured by Ciba Specialty Chemicals) were added into the radical polymerizable monomer with sufficient stirring to obtain a composition, and then γ-methacryloyloxypropyl trimethoxysilane (trade name: KBM503, manufactured by Shin-Etsu Chemical Co., Ltd.) was dropped into the composition with stirring.

Thereafter 0.1 parts by mass of a silicone-based leveling agent Y-7006 (polyoxyalkylene dimethylpolysiloxane copolymer; manufactured by NIPPON UNICAR Co., Ltd.) was added and mixed, and then the result was degassed by a rotation-and-revolution-type agitating and degassing device (AR-250, manufactured by THINKY Corporation) for 2 minutes, so that the preparation of a curable composition was completed.

[chemical formula 1]

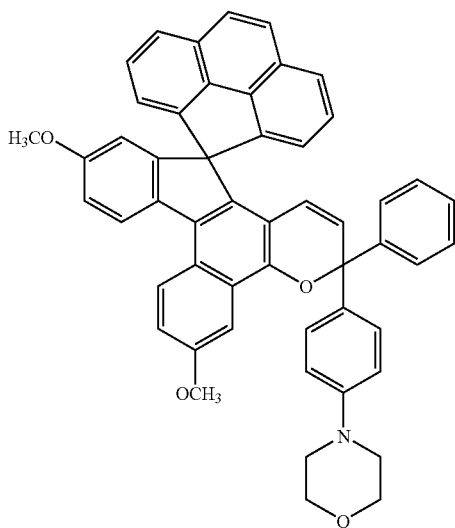

(ii) Form Photochromic Layer

The curable composition prepared in the process (2)-(i) was coated on the primer layer 2 of the substrate 1 by a spin coating method disclosed in Japanese Unexamined Patent Application Publication No. 2005-218994 (a coating method using a coating device having a spin holder for holding lens material and a dispenser for dispensing a coating liquid).

Thereafter, the lens was irradiated by ultraviolet light having a wavelength of 405 nm (irradiated from a UV lamp (D bulb) manufactured by Fusion) in a nitrogen atmosphere (with oxygen concentration of 500 ppm or less) until integrating quantity of light reached 1800 mJ/cm$^2$ (100 mW/cm$^2$, 3 minutes), and then the lens was further cured for 60 minutes at 100° C., so that the photochromic layer 3 was formed. The thickness of the first primer layer 2 was 40 μm.

Herein, a crosshatch test was performed to evaluate the adhesion between the substrate 1 and the photochromic layer 3 of the lens, and a good test result of 100/100 was obtained.

(3) Impact-absorbing Primer Coating (i) Prepare Primer Coating Liquid 250 parts by mass of a water-dispersed polyurethane (solid content: 30%; trade name: Adeka Bontiter HUX232) was added into a glass container having a magnetic stirrer and stirring was started, and 900 parts by mass of propylene glycol monomethyl ether was added into the glass container with sufficient stirring.

Thereafter, 6 parts by mass of silicone surfactant was added with sufficient stirring, and then the result was filtered, so that the preparation of the primer coating liquid was completed.

(ii) Form Primer Coating Layer

The lens with the photochromic layer 3 formed thereon in the process (2)-(ii) was immersed in a 10 wt. % aqueous sodium hydroxide solution at 60° C. for 5 minutes, and then sufficiently rinsed with pure water and dried.

Thereafter, the coating composition prepared in the process (3)-(i) was coated on the concave surface 1B side of the substrate 1 to form the second primer layer 4 having impact absorbing properties. The thickness of the second primer layer 4 was 1.0 μm.

(iii) Prepare Hard Coating Liquid 141 parts by mass of water-dispersed colloidal silica (solid content: 40%; average particle size: 15 mμ) was added into a glass container having a magnetic stirrer and stirring was started, and 30 parts by mass of acetic acid was added into the glass container with sufficient stirring.

Thereafter, 74 parts by mass of γ-glycidoxy propyl trimethoxy silane (manufactured by Shin-Etsu Chemical Co., Ltd.) was dropped, and the result was stirred at 5° C. for 24 hours.

Thereafter, 100 parts by mass of propylene glycol monomethyl ether, 150 parts by mass of isopropyl alcohol, 0.2 parts by mass of silicone surfactant and 7.5 parts by mass of acetylacetonatoaluminum (as curing agent) were added with sufficient stirring, and then the result was filtered, so that the preparation of the hard coating liquid was completed.

(iv) Form Hard Coat Layer

The hard coating composition prepared in the process (iii) was coated on the lens by dipping method (drawing speed: 20 cm/min), and then the coated composition was cured by heating at 110° C. for 60 minutes to form the hard coat layers 5, so that the hard coat layer 5 was respectively formed on both the convex surface 1A side and the concave surface 1B side of the substrate 1. At this time, on the convex surface 1A side of the substrate 1, the hard coat layer 5 was formed on the photochromic layer 3; and on the concave surface 1B side of the substrate 1, the hard coat layer 5 was formed on the primer layer 4.

(v) Form Antireflection Film

The antireflection film was formed on the lens having the hard coat layer 5 formed thereon in the process (iv) in a manner described below.

The lens having the hard coat layer 5 formed thereon was set into a vapor-deposition apparatus, and heating and exhausting were started until the temperature reached 85° C. and the pressure reached 2.67×10$^{-3}$ Pa. Thereafter, the material of the antireflection film was vapor-deposited by electron-beam heating method to form the antireflection films 6 having a stacked structure ($\lambda/4$-$\lambda/2$-$\lambda/4$; $\lambda$ represents wavelength) of $SiO_2$ and $ZrO_2$.

In such a manner, the plastic lens 10 shown in FIGS. 1 and 2 was manufactured as a plastic lens sample of Example 1.

Comparative Example 1

(i) Impact-Absorbing Primer Coating

In Comparative Example 1, 500 parts by mass of n-propyl cellosolve dispersed colloidal silica NPC-ST-30 (solid content: 30%; manufactured by Nissan Chemical Industries, Ltd.) was added into a glass container having a magnetic stirrer, and then 375 parts by mass of propylene glycol monomethyl ether was added little by little with forcible stirring.

Further, 125 parts by mass of a mixture of a blocked isocyanate compound and polyester polyol (theoretical solid content: 80 wt. %) was added little by little while keeping forcible stirring.

After 24 hours had elapsed, 0.2 parts by mass of silicone surfactant was added and stirring was further continued for 24 hours, so that the preparation of a coating composition for an impact-absorbing primer layer was completed.

A plastic lens having the hard coat layers 5 and the antireflection films 6 formed on both side thereof was manufactured as a plastic lens sample of Comparative Example 1. The plastic lens sample of Comparative Example 1 was manufactured in the same manner as Example 1 except that the coating composition was coated on both sides (the convex surface side and the concave surface side of the substrate) of the plastic lens having the photochromic layer 3 of Example 1.

Compared to the plastic lens 10 shown in FIG. 2, in the plastic lens of Comparative Example 1, a primer layer identical to the primer layer 4 having impact absorbing properties formed on the concave surface 1B side of the plastic lens 10 was also formed between the photochromic layer 3 and the hard coat layer 5.

Comparative Example 2

A plastic lens having the hard coat layers 5 and the antireflection films 6 formed on both side thereof was manufactured as a plastic lens sample of Comparative Example 2. The plastic lens sample of Comparative Example 2 was manufactured in the same manner as Example 1 except that the process (3) (i.e., the primer coating process) of Example 1 was skipped.

Compared to the plastic lens 10 shown in FIG. 2, in the plastic lens of Comparative Example 2, no primer layer 4 having impact absorbing properties was formed on the concave surface 1B side of the substrate 1, and therefore the hard coat layer 5 was directly formed on the concave surface 1B of the substrate 1.

<Measurement of Properties>

The following test methods were used to measure properties of plastic lens samples of Example 1, Comparative Example 1 and Comparative Example 2.

(1) Scratch Resistance Test

A scratch resistance test was performed using steel wool (#0000, manufactured by Nippon Steel Wool Co., Ltd.) to rub the surface of the plastic lens under a load of 1 kgf/cm², and the test result was visually evaluated to judge how difficult the scratch was formed in the surface. Evaluation criteria of the scratch resistance test are described below.

A. Almost no scratch is formed even when rubbing strongly.
B. Scratches are formed when rubbing strongly.
C. Scratches are formed as easily as a plastic substrate.

(2) Adhesion Test (Crosshatch Test)

100 crosshatch-cuts were formed at an interval of 1 mm, and an adhesive tape (trademark "CELLOTAPE", manufactured by Nichiban Co., Ltd.) was closely adhered to the crosshatched surface and then immediately peeled off to check whether the cut cured films were peeled off.

The test results were rated from 100/100 (which means no cut cured film was peeled off) to 0/100 (which means all cut cured films were peeled off).

(3) Impact Resistance Test

A rigid-ball drop test was performed to judge the impact resistance of the lens. To be specific, a rigid-ball was dropped down from 127 cm height toward the center of the lens, and the lens was judged to be acceptable if no crack was formed.

◯: Acceptable
X: Unacceptable (4) Light Modulating Performance (Change of Light Transmittance)

The photochromic properties of the lens were evaluated with a method in compliance with JIS T7333.

The light of a xenon lamp is irradiated onto the surface of the photochromic layer 3 of the photochromic lens through an air mass filter (air mass 2) for 15 minutes (900 seconds), and luminous transmittance was measured from the time when ultraviolet irradiation was stopped after the photochromic layer 3 was colored.

The higher the fading rate (the rate at which the transmittance is returned to its initial value) is, the better the photochromic properties are.

Figure 3:
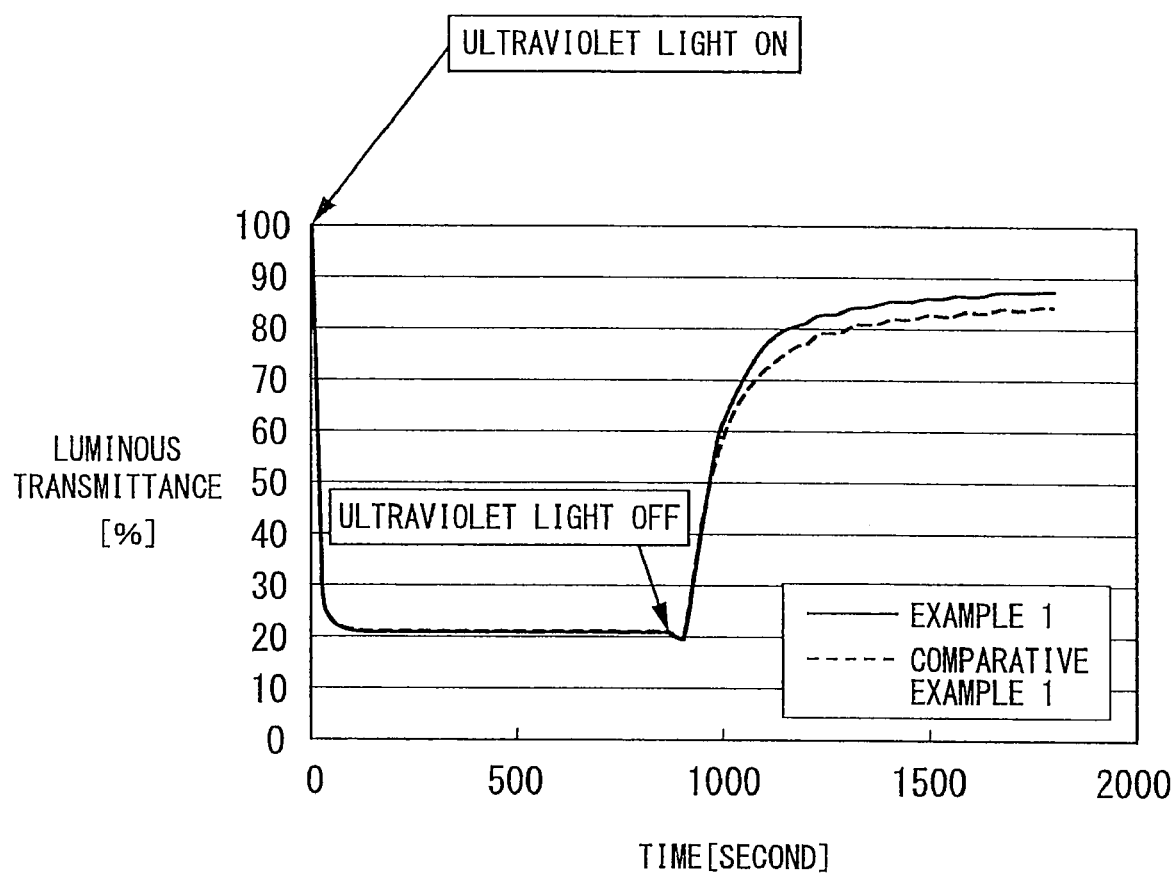
FIG. 3 is a graph showing a comparison between a measurement result of light modulating performance of a sample of Example 1 and a measurement result of light modulating performance of a sample of Comparative Example 1.

The results of item (1) scratch resistance test, item (2) adhesion test and item (3) impact resistance test for each of the example and comparative examples are shown in Table 1, and results of item (4) light modulating performance for Example 1 and Comparative Example 1 are shown in FIG. 3.

TABLE 1

| | (1) Scratch Resistance | (2) Adhesion | (3) Impact Resistance |
|---|---|---|---|
| Example 1 | A | 100/100 | ◯ |
| Comparative Ex. 1 | A | 100/100 | ◯ |
| Comparative Ex. 2 | A | 100/100 | X |

It can be known from Table 1 and FIG. 3 that all test results of the plastic lens of Example 1 are good, so that the plastic lens of Example 1 has good impact resistance and good light modulating performance attributed to photochromic properties.

It can be known from Table 1 and FIG. 3 that test results of items (1) to (3) of the plastic lens of Comparative Example 1 are good, however, the fading rate (the rate at which the transmittance is returned to its initial value) of Comparative Example 1 is lower than that of Example 1. In other words, since the impact-absorbing primer layer was formed on both sides of the substrate, the light modulating performance was deteriorated.

It can be known from Table 1 that test result of item (3) impact resistance test of the plastic lens of Comparative Example 2 is unacceptable, and which means the impact resistance is not good.

Thus, by forming the second primer layer 4 having impact absorbing properties only on the concave surface 1B side of the substrate 1 as Example 1, it is possible to provide a plastic lens having good impact resistance and good light modulating performance attributed to photochromic properties.

It is to be understood that the present invention is not limited to the embodiment described above, but may have various other configurations without departing from the spirit and scope of the present invention.

What is claimed is:

1. A plastic lens comprising:
   a plastic substrate having a first main surface that is a convex surface and a second main surface that is a concave surface;
   a photochromic compound-containing photochromic layer formed only on the convex surface side of the substrate; and
   an impact-absorbing primer layer formed only on the concave surface side of the substrate;
   a first hard coat layer formed on the side of the primer layer opposite to the side facing the substrate;
   a second hard coat layer formed on the side of the photochromic layer opposite to the side facing the substrate; and
   two antireflective films respectively formed on the first and second hard coat layers.

2. The plastic lens according to claim 1, wherein the primer layer is formed of polyurethane.

3. The plastic lens according to claim 1, wherein the plastic substrate comprises at least one material selected from the group consisting of a copolymer of methyl methacrylate and at least one other monomer, a copolymer of diethylene glycol bisallyl carbonate and at least one other monomer, a copolymer of polyurethane and polyurea, polycarbonate, polystyrene, polyvinyl chloride, unsaturated polyester, polyethylene terephthalate, polyurethane, polythiourethane, sulfide resin obtained by utilizing an ene-thiol reaction, and sulfur-containing vinyl polymer.

4. The plastic lens according to claim 1, wherein the photochromic layer is a structure obtained by dispersing a photochromic compound into a resin layer.

5. The plastic lens according to claim 4, wherein a thickness of the impact-absorbing primer layer is in a range of 0.1-3 μm.

6. The plastic lens according to claim 1, wherein the photochromic layer comprises at least one photochromic compound selected from the group consisting of fulgimide compound, spirooxazine compound, and chromene compound.

* * * * *